United States Patent [19]

Flaig

[11] 4,050,710
[45] Sept. 27, 1977

[54] APPARATUS TO REDUCE THE EFFECT OF LATERAL FORCES DURING TURNS AND/OR ONE-SIDED LOADS ON PERSONS IN A VEHICLE

[75] Inventor: Heinz Flaig, Wetter, Germany

[73] Assignee: DEMAG Aktiengesellschaft, Duisburg, Germany

[21] Appl. No.: 674,838

[22] Filed: Apr. 8, 1976

[30] Foreign Application Priority Data

Apr. 10, 1975   Germany ............................. 2515679

[51] Int. Cl.² .............................................. B60G 9/02
[52] U.S. Cl. ......................... 280/112 A; 267/57.1 R; 280/707
[58] Field of Search ............... 280/664, 695, 700, 707, 280/714, 717, 721, 104, 112 A; 267/57, 57.1 R, 57.1 A

[56] References Cited

U.S. PATENT DOCUMENTS

| | | | |
|---|---|---|---|
| 2,480,934 | 9/1949 | Julien | 280/721 |
| 3,071,366 | 1/1963 | Loehr | 280/721 |
| 3,490,786 | 1/1970 | Ravenel | 267/57 |
| 3,589,700 | 6/1971 | Ruet | 267/57 |
| 3,666,286 | 5/1972 | Engfer | 280/707 |

Primary Examiner—Joseph F. Peters, Jr.
Assistant Examiner—John A. Carroll
Attorney, Agent, or Firm—Mandeville and Schweitzer

[57] ABSTRACT

The invention covers an apparatus to reduce the effect of lateral forces during turns and/or one-sided or uneven loads on persons in a vehicle, whereby the chassis is provided with a feeler responding to lateral acceleration and inclination respectively, and the initial signal of a regulator arranged at the starting point of the feeler influences the device to tilt the chassis versus the carriage around an axis which is parallel with the longitudinal axis of the vehicle.

13 Claims, 3 Drawing Figures (II-II)

(III-III)

APPARATUS TO REDUCE THE EFFECT OF LATERAL FORCES DURING TURNS AND/OR ONE-SIDED LOADS ON PERSONS IN A VEHICLE

BACKGROUND AND STATEMENT OF THE INVENTION

Such devices have been suggested for vehicles with pneumatic springs and are known as taught for example, in German Pat. No. 1,455,101. However, these can be applied economically only in vehicles with already existing compressed air installation for the pneumatic springs, but not in vehicles with mechanical springs. Gases and air in control mechanisms have the disadvantage that pressures and consequently the control settings change with different temperatures resulting from pressure variations.

It is the object of this invention to create an inexpensive, simple and trouble-free installation to reduce the effect of lateral forces during turns and/or uneven loads on persons in a vehicle. This is solved by a mechanical device which influences the lift inclination on the side of the vehicle chassis which is too low, in the sense of a lifting motion, while simultaneously lowering the lift inclination of that side of the vehicle chassis which is too high at the beginning. During onesided or unilateral loads, or under the influence of a lateral force during turns when the road elevation does not match the actual speed, the feeler, via the regulator and the mechanical device, causes one side of the vehicle to rise, while the other side of the vehicle is lowered. The medium height is not altered as the mechanism produces adjusting forces only, not absolute forces.

The mechanical apparatus of the invention consists of a lifting and lowering device, with two coaxially arranged rods rotatable in relation to each other, which are arranged at right angles with the longitudinal vehicle axis at one part of the vehicle (either carriage or chassis), whereby the rod ends facing each other are each provided with an expanding and contracting lever for the engagement of an expanding and contracting device; and lifting and lowering levers are hinged at the rod ends facing away from each other, such levers either representing directional movement devices arranged between carriage and chassis, or communicating with such movement devices, so that when rotating the two rods opposite to each other by contracting the expanding and contracting device, the control impulse sent out by the feeler will set the chassis on an incline in relation to the carriage to facilitate a pleasnt taking of turns, in a way where the resultant of lateral and gravitational forces affects the chassis vertically. Under unilateral load the chassis would be more inclined; in this case the apparatus causes the chassis to be maintained horizontal.

Preferably, the expanding and contracting levers at the zero position of the expanding and contracting device are arranged at an angle of approximately 60°. The lifting and lowering levers are inclined at an angle of approximately 25° from the horizontal when the vehicle is loaded. In both working directions, this angle arrangement causes an even tilt of the chassis in relation to the carriage at a certain degree of expansion.

Further in accordance with the invention, when utilizing springs between carriage and chassis, a device is provided to increase the initial tension of the spring located on that side of the vehicle under a lower load, and provides that the resulting reaction force is directed to the spring already under higher initial tension, so that the chassis is maintained horizontal and vertical, respectively, in relation to the applied lateral force.

Preferably, the coaxially arranged rods are arranged coaxially to rubber sleeve springs (rotary springs) of the vehicle. The rods provided with the lifting and lowering levers are connected with the inner rings of the rubber sleeve springs, and, therefore, rest on one part of the vehicle (either carriage or chassis). The lifting and lowering levers function simultaneously as spring rockers which are also, at the far ends of the coaxially arranged rods, connected with additional rubber sleeve springs resting at the other part of the vehicle. In this manner, the apparatus to reduce the effect of lateral forces during turns is connected to the springs of the vehicle.

The coaxially arranged rods function simultaneously as torsion rod springs. Preferably, they are connected via a plug contact and rotate in relation to each other. The rods consist of tubes and the plug contact consists of a barrel or tubular insert, with a central collar which is inserted between the ends of the rods. If both rods are arranged at the vehicle part in the center or near the center of the vehicle, the plug contact between the rods becomes superfluous.

The expanding and contracting device of the invention is a cylinder-piston unit, where both ends of the cylinder are connected to a pump controlled by the regulator, via pressure lines. The pump merely serves to transmit the fluid under pressure from one cylinder chamber to the other. The expanding and contracting device may also consist of an electromotor with a thread pin, worm gear, or similar arrangement. The zero position of the expanding and contracting device is the median position between expanded and contracted state, so that inclinations of the chassis versus the carriage are possible on both sides.

The end facing away from the rod of one of the expanding and contracting levers is a forked piece, in which is arranged either the cylinder or the electromotor of the expanding and contracting device.

The device disclosed in the invention may be arranged either at the front or at the rear of the vehicle whose chassis is rigid, and thus inclined as a whole unit. If the device is not combined with the springs, it may also be located in the center of the vehicle.

DETAILED DESCRIPTION OF THE INVENTION

Figure 1:
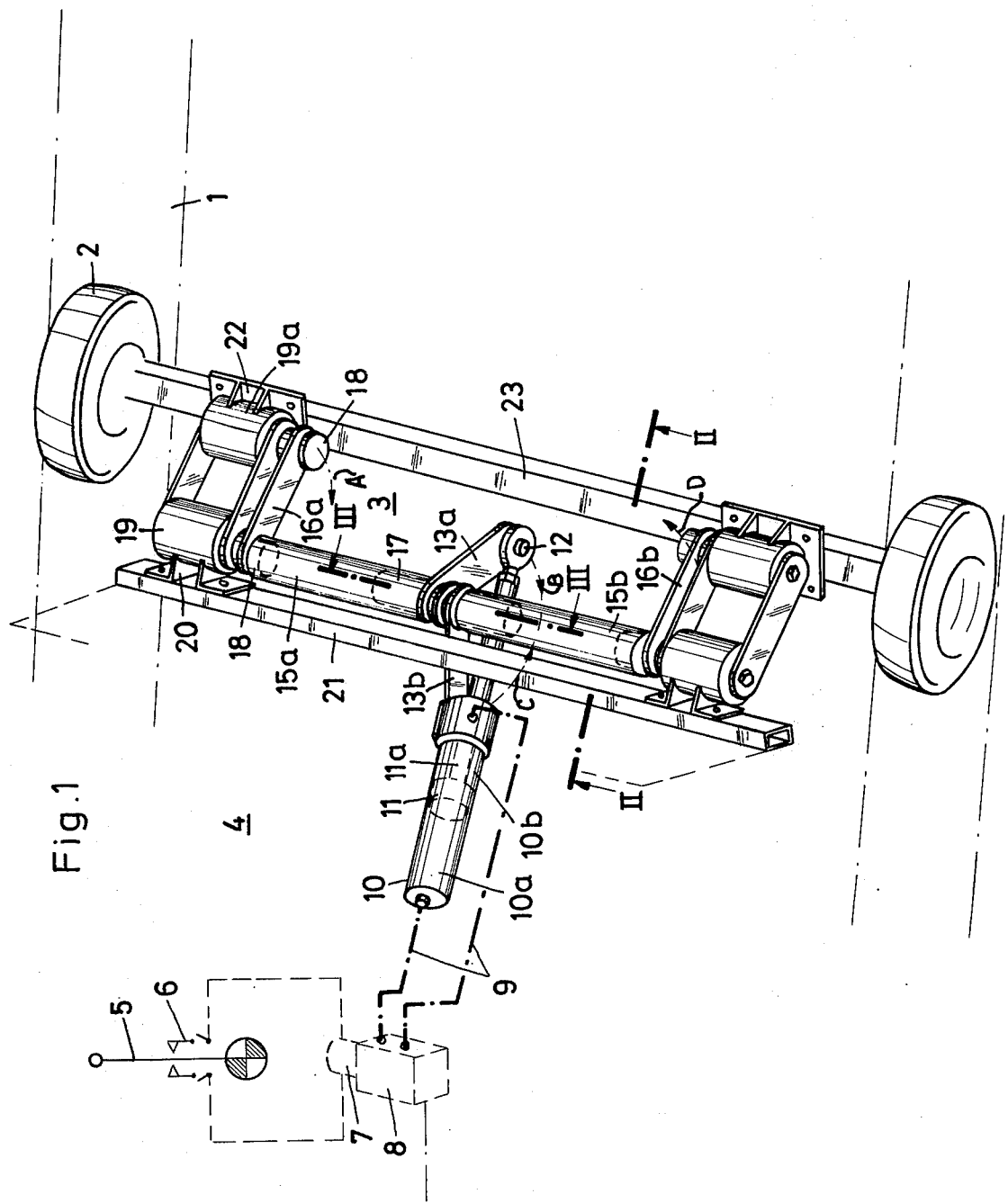
FIG. 1 is a perspective view of the device of the invention mounted at one end of the vehicle.
Figure 2:
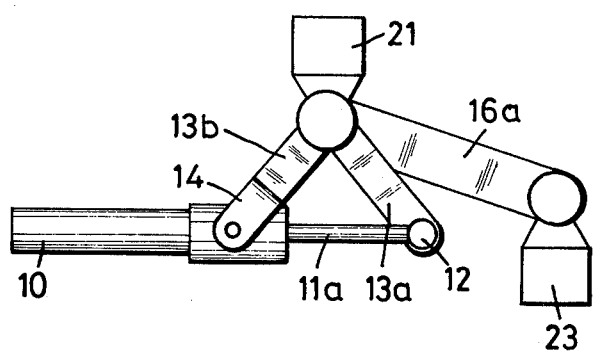
FIG. 2 is a section along line II—II of FIG. 1.

Rails 1 indicated in dot-dash lines carry wheels 2 of a carriage 3, its chassis 4 with feeler 5, two contacts 6 and a regulator 7 with pump 8 also being indicated in dot-dash lines. Pressure fluid lines 9 lead from the pump of the regulator into upper cylinder chamber 10a and lower cylinder chamber 10b of cylinder 10, which contains piston 11 provided with piston rod 11a.

Figure 3:
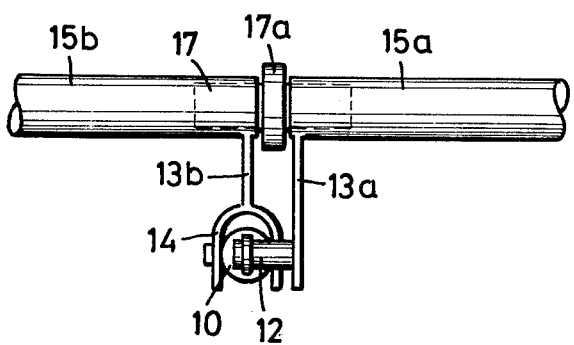
FIG. 3 is a section along line III—III of FIG. 1.

Cylinder 10 is mounted in fork head 14 of expanding and contracting lever 13b, its end facing away from the fork head being fixed on rod 15b. Piston rod 11a is mounted, via bolt 12, at contracting and expanding lever 13a which is fixed on rod 15a. Rod 15b is equipped with barrel 17 in the vehicle center for the bearing of 15a. Barrel 17 is inserted with central collar 17a between rods 15a and 15b, as is visible in FIG. 3.

The outer ends of rods 15a and 15b are also mounted at cabin transverse cross beam 21 via rubber sleeve springs 19 and brackets 20. The outer ends of rods 15a and 15b are equipped with fixed lifting and lowering levers 16a and 16b, their ends being connected, via rubber elements 18, with inner rings 19a of rubber sleeve springs 19 and via brackets 22 with carriage transverse axle 23.

Feeler 5 arranged as a dynamic counterweight is flexibly suspended in chassis 4. During standstill of the vehicle, the feeler hangs vertically and during turns it will swing sideways in accordance with the applicable lateral acceleration. If a vehicle takes a turn with the provided velocity and the rails are elevated accordingly, the chassis 4 will lean in accordance with the swing of the feeler 5. If these conditions are not met and the inclination of chassis 4 does not match the swing of feeler 5, it will touch one of the contacts 6.

The same applies for one-sided loads of the chassis. If, for example, chassis 4 is pushed down on the right side according to arrow A, contact 6 stationary in chassis 4 will move towards feeler 5. Right contact 6 will cause a pressure fluid supply to flow into cylinder chamber 10b via regulator 7 and pressure fluid pump 8 through pressure fluid line 9. Simultaneously, the regulator permits the pressure fluid to escape from cylinder chamber 10a. Piston 11 then moves up in cylinder 10 and pulls piston rod 11a into cylinder 10. Piston 11 and cylinder 10 cause expanding and contracting levers 13a and 13b to move toward each other in the direction of arrows B and C, whereby rods 15a and 15b rotate in relation to each other. Together with rods 15a and 15b the attached lifting and lowering levers 16a and 16b move in the direction of arrows A and D. The right lifting and lowering lever 16a moves down in relation to the chassis. As wheel 2 resting at chassis 4 runs on rail 1, the chassis of vehicle 4 is lifted on the right side and lowered on the left, as the left lifting and lowering lever 16b moves up. Chassis 4 will then be in a position where feeler 5 does not touch either one of contacts 6.

I claim:

1. Apparatus for reducing the tilting effect upon vehicles resulting from uneven loads and applied lateral forces in turning, comprising
   a. a vehicle including a carriage and a chassis;
   b. a dynamic feeler disposed on said vehicle, said feeler mounted to respond by swinging to tilting movements of said vehicle;
   c. a regulator mounted between said chassis and said carriage and responsive to movements of said feeler for tilting said chassis in relation to said carriage around an axis parallel to the longitudinal axis of the vehicle; said regulator characterized by
   d. a pair of rods on said vehicle rotatably mounted transversely of said longitudinal axis in coaxial alignment with each other;
   e. said rods being rotatable with respect to each other;
   f. a lever fixed on each of said rods at the ends thereof facing each other;
   g. a reversible expanding and contracting device connected to said feeler;
   h. one of said levers pivotally connected to one end of said expanding and contracting device and the other of said levers pivotally connected to the other end of said expanding and contracting device;
   i. said levers being movable toward and away from each other in response to said expanding and contracting device for rotating said rods in opposite directions to each other;
   j. a pair of lifting and lowering arms with one each fixed to one of said rods at the ends thereof opposite said levers; and
   k. each of said pair of lifting and lowering arms pivotally connecting said chassis to said carriage for tilting one in relation to the other in response to said regulator.

2. The apparatus of claim 1, further characterized by
   a. said levers being positioned at an angle of about 60° to each other when said expanding and contracting device is at zero position.

3. The apparatus of claim 2, further characterized by
   a. said lifting and lowering arms being inclined at an angle of about 25° from horizontal.

4. The apparatus of claim 1, further characterized by
   a. springs mounted at said pivot connections of each of said lifting and lowering arms with said chassis and said carriage; and
   b. said regulator causing increased tension to said springs on the side of said vehicle receiving an uneven load.

5. The apparatus of claim 4, further characterized by
   a. said springs being rotary sleeve springs.

6. The apparatus of claim 5, further characterized by
   a. each of said pair of rods connected to its respective lifting and lowering arm by the inner rings of said rotary sleeve springs; and
   b. the connection between each said rod end and its respective inner ring being rubber.

7. The apparatus of claim 6, further characterized by
   a. the pivotal connections of each of said lifting and lowering arms at the ends thereof opposite said rod connections include rotary rubber sleeve springs.

8. The apparatus of claim 1, further characterized by
   a. said pair of rods are torsion bars.

9. The apparatus of claim 1, further characterized by
   a. said expanding and contracting device being a reversible pressure fluid piston and cylinder unit.

10. The apparatus of claim 9, further characterized by
    a. a reversible pump connected to said feeler; and
    b. pressure fluid lines connecting said pump to each end of said piston and cylinder unit.

11. The apparatus of claim 1, further characterized by
    a. said expanding and contracting device is an electromotor, including a thread pin, and worm gear.

12. Apparatus for reducing the tilting effect upon vehicles resulting from uneven loads and applied lateral forces in turning, comprising
    a. a vehicle including a carriage and a chassis;
    b. a feeler disposed on said vehicle, said feeler mounted to respond to tilting movements of said vehicle;
    c. a regulator mounted between said chassis and said carriage and responsive to movements of said feeler for tilting said chassis in relation to said carriage around an axis parallel to the longitudinal axis of the vehicle; said regulator characterized by
    d. a pair of rods on said vehicle mounted transversely of said longitudinal axis in coaxial alignment with each other;
    e. said rods being rotatable with respect to each other;
    f. a lever fixed on each of said rods at the ends thereof facing each other;

g. a reversible expanding and contracting device connected to said feeler;
h. one of said levers pivotally connected to one end of said expanding and contracting device and the other of said levers pivotally connected to the other end of said expanding and contracting device;
i. said levers being movable toward and away from each other in response to said expanding and contracting device for rotating said rods in opposite directions to each other;
j. a pair of lifting and lowering arms with one each fixed to one of said rods at the ends thereof opposite said levers;
k. each of said pair of lifting and lowering arms pivotally connecting said chassis to said carriage for tilting one in relation to the other in response to said regulator;
l. said rods being elongated tubes;
m. a round elongated bar extending between said tubular rods;
n. each of said rods being rotatable on one end of said bar; and
o. said bar including a central divider collar for spacing the facing ends of said rods on said bar.

13. Apparatus for reducing the tilting effect upon vehicles resulting from uneven loads and applied lateral forces in turning, comprising
a. a vehicle including a carriage and a chassis;
b. a feeler disposed on said vehicle, said feeler mounted to respond to tilting movements of said vehicle;
c. a regulator mounted between said chassis and said carriage and responsive to movements of said feeler for tilting said chassis in relation to said carriage around an axis parallel to the longitudinal axis of the vehicle; said regulator characterized by
d. a pair of rods on said vehicle mounted transversely of said longitudinal axis in coaxial alignment with each other;
e. said rods being rotatable with respect to each other;
f. a lever fixed on each of said rods at the ends thereof facing each other;
g. a reversible expanding and contracting device connected to said feeler;
h. one of said levers pivotally connected to one end of said expanding and contracting device and the other of said levers pivotally connected to the other end of said expanding and contracting device;
i. said levers being movable toward and away from each other in response to said expanding and contracting device for rotating said rods in opposite directions to each other;
j. a pair of lifting and lowering arms with one each fixed to one of said rods at the ends thereof opposite said levers;
k. each of said pair of lifting and lowering arms pivotally connecting said chassis to said carriage for tilting one in relation to the other in response to said regulator; and
l. the connection between one of said levers and said expanding and contracting device being a forked lever.

* * * * *